US011909509B2

(12) United States Patent
Shay et al.

(10) Patent No.: US 11,909,509 B2
(45) Date of Patent: Feb. 20, 2024

(54) DISTRIBUTED AUDIO MIXING

(71) Applicant: TLS Corp., Cleveland, OH (US)

(72) Inventors: Gregory F. Shay, Mentor, OH (US); Robert Dye, Saint Petersburg, FL (US); Barry Blesser, Belmont, MA (US)

(73) Assignee: TLS Corp., Cleveland, OH (US)

( * ) Notice: Subject to any disclaimer, the term of this patent is extended or adjusted under 35 U.S.C. 154(b) by 0 days.

(21) Appl. No.: 17/594,176

(22) PCT Filed: Mar. 10, 2020

(86) PCT No.: PCT/US2020/021891
§ 371 (c)(1),
(2) Date: Oct. 5, 2021

(87) PCT Pub. No.: WO2020/205175
PCT Pub. Date: Oct. 8, 2020

(65) Prior Publication Data

US 2022/0182163 A1 Jun. 9, 2022

Related U.S. Application Data

(60) Provisional application No. 62/830,277, filed on Apr. 5, 2019.

(51) Int. Cl.
*H04R 3/12* (2006.01)
*H04H 60/04* (2008.01)

(52) U.S. Cl.
CPC ............... *H04H 60/04* (2013.01); *H04R 3/12* (2013.01); *H04R 2420/01* (2013.01); *H04R 2430/01* (2013.01)

(58) Field of Classification Search
CPC ... H04R 3/12; H04R 3/04; H04R 5/04; H04R 2420/07; H04R 27/00; H04R 2420/01; H04R 2430/01
(Continued)

(56) References Cited

U.S. PATENT DOCUMENTS 5,734,731 A 3/1998 Marx
5,896,459 A 4/1999 Williams, Jr.
(Continued)

FOREIGN PATENT DOCUMENTS

GB 2381175 A 4/2003
GB 2540225 A 1/2017
(Continued)

OTHER PUBLICATIONS

PCT/US2020/021891; International Search Report and Written Opinion of the International Searching Authority dated Jun. 15, 2020.
(Continued)

*Primary Examiner* — Disler Paul
(74) *Attorney, Agent, or Firm* — Renner, Otto, Boisselle & Sklar, LLP

(57) ABSTRACT

Distributed audio mixing may include transmitting a set of parameters from a local location to one or more remote locations at least multiple miles away from the local location for, at each of the one or more remote locations, one or more remote audio sources to be processed according to the parameters to produce respective one or more remote audio mixes; processing one or more local audio sources according to the parameters to produce a local audio mix; receiving the one or more remote audio mixes; and locally summing the one or more remote audio mixes to the local audio mix to obtain a final audio mix.

24 Claims, 5 Drawing Sheets

(58) Field of Classification Search
USPC ............... 381/77, 82, 80, 119, 109, 118, 79, 381/104–105
See application file for complete search history.

(56) References Cited

U.S. PATENT DOCUMENTS 6,782,108 B2 * 8/2004 Shibata .................. H04H 60/04 381/119
7,096,080 B2 * 8/2006 Asada .................... H04H 60/04 381/119
8,355,509 B2 1/2013 Faller
8,385,566 B2 2/2013 Stieler von Heydekampf et al.
8,600,951 B2 * 12/2013 Bosley .................. H04L 67/104 707/673
8,873,774 B2 10/2014 Rijken et al.
9,025,415 B2 5/2015 Derkx
9,031,262 B2 * 5/2015 Silfvast .................... G10H 1/18 381/98
9,514,723 B2 * 12/2016 Silfvast .................... G10H 1/18
9,532,136 B2 12/2016 Uhle et al.
9,584,917 B2 * 2/2017 Menke ..................... H04R 5/04
9,608,747 B2 3/2017 Okabayashi
9,628,206 B2 4/2017 Perkins
9,838,146 B2 12/2017 Chavez et al.
9,952,826 B2 4/2018 Rowe et al.
2010/0303261 A1 12/2010 Stieler von Heydekampf et al.
2011/0038229 A1 2/2011 Beaucoup
2012/0195445 A1 8/2012 Inlow
2017/0365273 A1 12/2017 Wang et al.

FOREIGN PATENT DOCUMENTS

WO 2016079526 A1 5/2016
WO 2017176941 A1 10/2017

OTHER PUBLICATIONS

Philipp Berndt et al.; “Crowd buzz: scalable audio communication for MMVEs using latency optimized hypercube gossiping”, Oct. 14, 2011, pp. 1-6.

* cited by examiner

N = 2

N = 4

N = 8

N = 16

N = 11

DISTRIBUTED AUDIO MIXING

BACKGROUND

Production of audio program material for television, radio, recording, entertainment, and any other media industries typically consists of combining together multiple audio source programs into a "mix." A principal goal of audio program production is for the combination of certain loudness and audio processing proportions to be aesthetically pleasing. A typical mix is a sum of audio signals weighted by amplitude loudness factors of each contributing audio source. The process of mixing is most often done by a human operator and involves skill, talent, and artistic choice.

Many sources and factors must be considered in a complex and busy show production. Often, dozen or even hundreds of source audio elements must be combined to obtain the desired outcome. A mistake may result in a very noticeable and audible "something wrong" with the audio program that may be transmitted to thousands or even millions of people in a listening audience. Therefore, primary goals in the design of audio mixing equipment include the reduction of complexity of configuration and operation, simplification of decisions to be made, and straightforward and understandable operator flow.

At the same time, the economics of modern facility planning are moving the media (audio, video, other content) production industry to adopt architectures in which equipment is split into various locations and/or remote from operators. A majority of the equipment may be centrally located in one facility. The human operators, on the other hand, may be located in a different facility geographically local to the event, show, community, center of interest, etc., but geographically distant from the centrally located majority of equipment. This geographically spread structure also applies where the centrally located equipment is implemented in pure software run on commercially available computer server services such as, for example, Amazon AWS®, Google® Compute Engine, Microsoft® servers, etc. otherwise known as "the cloud." The transmission of audio and other media signals back and forth between locations may be accomplished using modern networks, typically IP networks, local area networks connected with wide area networks (WAN), private WANs, high speed network backbones and/or the Internet.

The geographic separation between the human operator and the centralized equipment raises some important problems and creates some barriers.

SUMMARY

First, audio data transmissions travelling back and forth between locations experience a time delay, also called latency that, at some point, cannot be further reduced or eliminated by higher speed networks. A higher speed network can carry more data at higher rates, but the time delay is fundamentally dictated by the speed of the signal propagation down cables and/or fiber optic whose transmission speeds may be a fraction of the speed of light (300 million meters per second in a vacuum). Typical speed of signal propagation on cables and fiber optic is anywhere from 60% to 80% of the speed of light in a vacuum. This delay between geographic locations (between cities, across nations, or halfway around the globe) may be from tens to a few hundreds of milliseconds, and may create an audible delay for which, for example, listening to your own voice is objectionable.

Second, to produce a mix of all the audio sources from the different locations, all of the contributing audio has to be summed together, which implies all of the individual audio channels have to be communicated to one location, the mixing point. Given there may be dozens or even hundreds of contributing audio sources, this would require many audio channels communicating long distance between locations. Transmitting multiple audio channels may be costly as it consumes significant amounts of network bandwidth. Furthermore, audio quality of each of these audio channels must be very high, very low noise. This is because any noise present is summed into the mix as well and, thus, many sources of noise would combine in the mix to produce a noisy and undesirable final product that the audience would hear as a low-quality program. Many channels of high-quality professional audio consume an even higher quantity of network bandwidth, which is costly as a resource.

A potential solution to the above difficulties is to use multiple audio mixing devices, one at each location. Each location does its mixing independently, creating sums of subsets of the audio sources, then the results of these "subset sums" may be sent to a location where the final sum of all of the subset sums may be combined to make the final mix. No audio source should be included in the final sum more than once because the audio source would be overrepresented (i.e., too loud) or would have phase difference summation problems due to the timing differences. A common technique is to use what is called a "mix-minus," which means a mix of all audio sources, minus the sources originating at where the mix-minus is being sent to. The mix-minus at that source location is summed with the local sources, and mix-minus summed with the missing minus audio, forms the final sum mix without any repeats, overlap, or doubling of audio sources. A difficulty with this solution, however, is the increased complexity in coordination of configuration, operation, and control of the multiple audio mixing devices in different locations, connected to different audio sources, changing over time of day and schedule of programs, different personnel, etc. A significant goal then is to minimize the cost and overhead to coordinate the diverse and distributed parts of this complex operation.

The present disclosure describes novel techniques for mixing audio and control of the mixing process when the operation is to be carried out in two more locations. These techniques include specific partitioning arrangements, design and definition of the audio mixing signal processing operations at the multiple locations. The systems and methods disclosed herein simplify the configuration and operation of performing the audio mixing task in the distributed situation, rather than having the coordination between multiple locations create burdensome additional complexity, operational overhead costs, and human operator workload and stress.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

The techniques disclosed herein solve the difficulties of performing the audio mixing production task split between two or more geographically separated locations.

Figure 1:
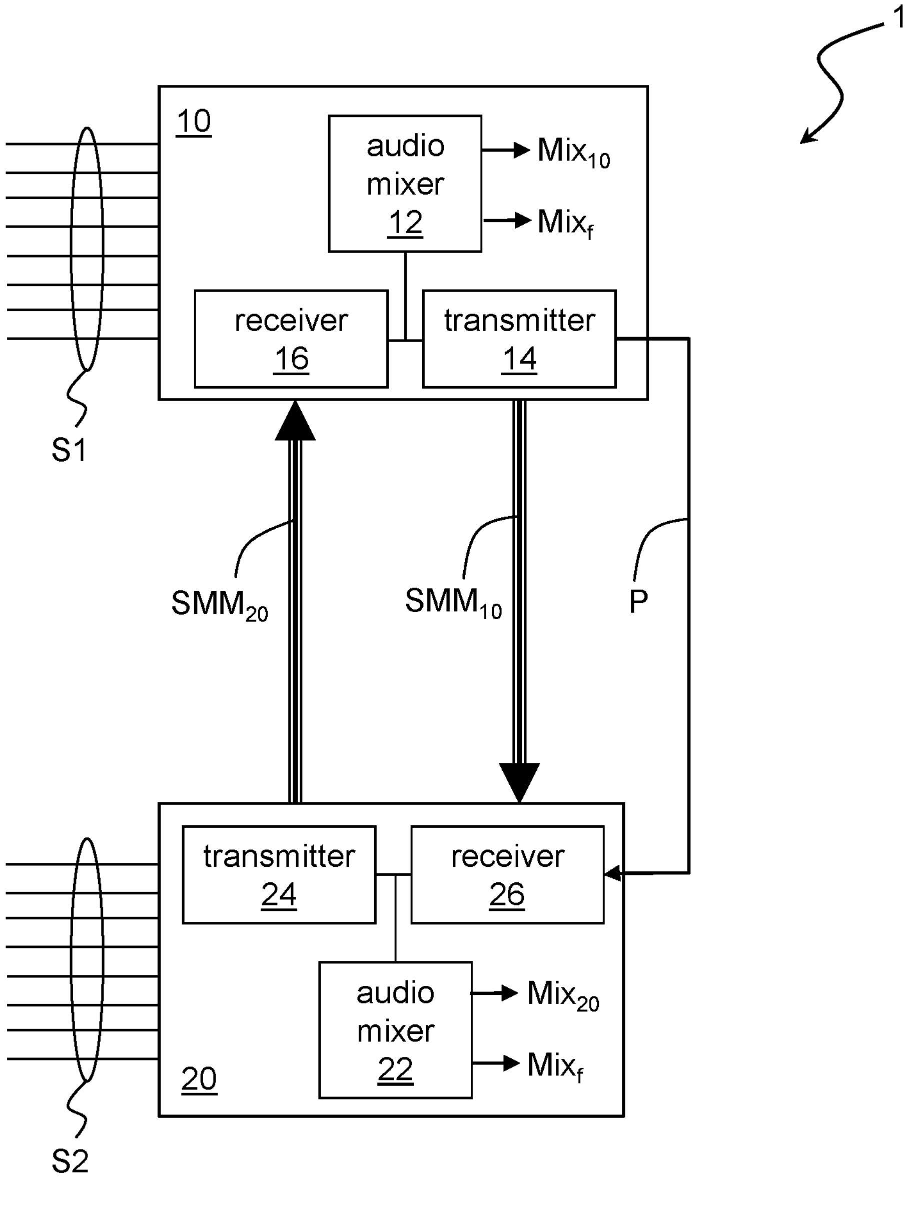
FIG. 1 illustrates a block diagram of an exemplary distributed audio mixing system.

FIG. 1 illustrates a block diagram of an exemplary distributed audio mixing system 1. The system 1 includes two nodes 10, 20. Node 10 may correspond to a remote central facility where the majority of the audio equipment is centrally located. Node 20 may correspond to a different facility geographically local to an event, show, community, center of interest, etc., but geographically distant from the node 10. The nodes 10 and 20 may be multiple miles (tens, hundreds, thousands, etc.) away from each other.

The node 10 may be implemented as a more traditional "mission control center" with dedicated audio equipment (mixers, audio processors, etc.) or it may be implemented in pure software run on commercially available computer server services (e.g., Amazon AWS®, Google® Compute Engine, Microsoft® servers, etc.) otherwise known as "the cloud." The transmission of audio and other media signals back and forth between nodes 10 and 20 may be accomplished using traditional networks (e.g., over-the-air, cable, fiber, etc.) or more modern networks (e.g., IP networks, local area networks connected with wide area networks (WAN), private WANs, high speed network backbones and/or the Internet.) A preferred embodiment uses software mixers.

Each node 10, 20 has direct access to its local audio sources S1, S2, while these sources are not directly available to any other node. Each node 10, 20 also has a bidirectional connection to the other node.

Each node 10, 20 is responsible for creating and sending its own local mix $Mix_{10}$, $Mix_{20}$. For this purpose, each node 10, 20 may include an audio mixer 12, 22 to process (or control processing) of its own local audio sources S1, S2 and produce its own local audio mix $Mix_{10}$, $Mix_{20}$ according to parameters P received, in this example, from the node 10, the central facility. The node 10 may include a transmitter 14 that transmits parameters to all nodes in the network including, in this example, the node 10 (itself) and the node 20. Each node 10, 20 may also include a receiver 16, 26 to receive the parameters P and the audio mixer 12, 22 to process (or control processing of) the local audio sources S1, S2 according to the parameters P to produce the local audio mix $Mix_{10}$, $Mix_{20}$.

The function of the audio mixer 12, 22 may be best expressed as a mathematical function. A simple audio mix is the weighted sum of the audio sources:

$$\text{Mix} = \sum_{i}^{n} F_i * \text{Audio}_i$$

Where $F_i$ represents the weight (or amplitude) of number n individual audio sources $\text{Audio}_i$. One exemplary implementation of this may be an audio fader on a mixing board or on a touch screen, but may be any operator control for setting loudness of that audio source in the mix.

An even more representative equation may include the per channel processing (e.g., equalization, compression, gain, or any other functions), that may be applied to the individual audio source before the summation:

$$\text{Mix} = \sum_{i}^{n} F_i * CP_i(\text{Audio}_i)$$

Where CPi( ) represents the processing function or functions selected and controlled by the operator and performed on that individual audio channel. Thus, audio parameters in this context may include configuration parameters and operating parameters.

There are many possible ways to rearrange, factor, split up and recombine this basic audio mixing function. The present disclosure splits the desired mix into two or more parts, in a certain way.

First, for the two nodes example of FIG. 1, we split the equation into two identical copies of sub mixing operations to obtain a final mix:

$$\text{Mix}_f = \sum_{i}^{n} F_i * CP_i(L_{10} * \text{Audio}_i) + \sum_{i}^{n} F_i * CP_i(L_{20} * \text{Audio}_i)$$

Where the two locations correspond to the nodes 10, 20 and $L_{10}$, $L_{20}$ represent location selection factors (e.g., $L_{10}=1$ when the particular audio source is present in node 10 and $L_{10}=0$ when the particular audio source is not present in node 10, etc.) The implementation of the multiplication by L does not have to be an explicit multiplication by zero or one but may be any process that has the equivalent result. For example, if an audio source is not present and, therefore, its input signal defaults to zero (no audio), this has the equivalent result of L=0.

For the general case of more than two nodes a, b, m, the final mix is m identical sub mixing operations:

$$\text{Mix}_f = \sum_{i}^{n} F_i * CP_i(L_a * \text{Audio}_i) + \sum_{i}^{n} F_i * CP_i(L_b * \text{Audio}_i) + \cdots + \sum_{i}^{n} F_i * CP_i(L_m * \text{Audio}_i)$$

Back to the example of FIG. 1, we may treat each of the sub-mixes independently, since these happen at physically different locations:

$$\text{Mix}_{10} = \sum_{i}^{n} F_i * CP_i(L_{10} * \text{Audio}_i)$$

$$\text{Mix}_{20} = \sum_{i}^{n} F_i * CP_i(L_{20} * \text{Audio}_i)$$

Then the final mix can be formed thus, conveniently for node 10:

$$\text{Mix}_f = \sum_i^n F_i * CP_i(L_{10} * \text{Audio}_i) + \text{Mix}_{20}$$

Or equivalently, producing exactly the same final mix result for node 20:

$$\text{Mix}_f = \sum_i^n F_i * CP_i(L_{20} * \text{Audio}_i) + \text{Mix}_{10}$$

In other words, the $\text{Mix}_{10}$ and $\text{Mix}_{20}$ can be described as partial mixes, which contain the mix of audio sources in that location which are relevant for the desired final mix. These partial mixes are somewhat related to, but not exactly the same as the traditional and aforementioned "mix-minus." These are partial sums for the purpose of effecting a less complex distributed mix and contain more than just the simple "mix-minus" of the source they are sent back to. From this point, this disclosure refers to these partial sums as super mix minus or SMM (thanks to our colleague Kirk Harnack who coined the term).

Now at each location where the final mix $\text{Mix}_f$ is desired, it can be computed by mixing the local audio sources with the super mix minus from the other location(s). Using the super mix minus terminology, at the node 10:

$$\text{Mix}_f = \sum_i^n F_i * CP_i(L_{10} * \text{Audio}_i) + SMM_{20}$$

And symmetrically at node 20:

$$\text{Mix}_f = \sum_i^n F_i * CP_i(L_{20} * \text{Audio}_i) + SMM_{10}$$

And, in the general case, at any node a in a network of two or more nodes a, b, . . . m:

$$\text{Mix}_f = \sum_i^n F_i * CP_i(L_a * \text{Audio}_i) + SMM_b + \ldots + SMM_m$$

By using the super mix minus or SMM, the number of audio channels that must be communicated between locations is potentially greatly reduced as compared to having to communicate the full set of audio sources individually, as is traditionally a problem with distributed mixing. The rule becomes: the number of cross-communicated audio channels between the locations is independent of the number of audio sources in the final mix but is only dependent on the number of SMM required to form the final mix. And the number of SMM required is the number of final mixes that have audio source contributions from locations other than the location where the final mix is desired. This can have a profound benefit, reducing the number of long distance-communicated audio channels from hundreds to only a few, or one for each desired final mix. These techniques allow for any number of final mixes without additional complexity. Often, a production requires audio mixes for different end purposes: a local monitor, headphones, a main program feed, a program feed in alternate languages, a dry feed without special effects, etc. The techniques disclosed herein do not place restrictions on the number of final mixes that may be produced.

In one embodiment, the SMM are communicated between nodes either with or without using a data reduction audio compression codec encoder/decoder, over an IP network, a wide area network, and/or the Internet, and may or may not be encrypted. In one embodiment, the audio interconnection is performed using industry standard AES67 and being synchronized by PTP timing referenced to GPS or global atomic time.

Also note that, conveniently, exactly equivalent final mixes $\text{Mix}_f$ can be made available in both (or all N) nodes 10, 20, which may be useful since, for example, the final mix $\text{Mix}_f$ may need to be monitored by a human operator at the node 20 and also may need to be connected to higher level communications equipment at the centralized location, node 10. The receivers 16, 26 (or a different receiver) of each node 10, 20 may receive the remote audio mix (i.e., the SMM from the other node 10, 20), and the audio mixer 12, 22 (or another audio mixer) may locally sum the remote audio mix to the local audio mix to obtain the final audio mix $\text{Mix}_f$.

In one embodiment, the receivers 16, 26 receive, in addition to the remote audio mix (i.e., the SMM from the other node 10, 20), identity information of remote audio sources mixed in the remote audio mix. In one embodiment, location information of these remote audio sources is either expressly included in the identity information or derivable from the identity information.

Knowledge of the location of the audio sources, either set at time of configuration or automatically determined by the identity or address of the audio sources, may be allowed to be dynamic, i.e., to change over time. In one embodiment, the receivers 16, 26 (or a second receiver in the respective node 10, 20) may continuously or periodically receive location information of the one or more remote audio sources in the SMM. This may be necessary because location (i.e., the node dealing with the audio source) of one or more of the audio sources can change from one node to another. This makes the split mixer fault tolerant. Let's say, for example, that one of the audio sources in S1 becomes unavailable at node 10. The system 1 may make the audio source available at node 20 as part of audio sources S2 as a backup or standby.

Complexity does not increase because the fundamental operation of the system 1 allows the new information of the changed node of the audio source to be sent to all nodes equivalently. Each node 10, 20 in the system 1 uses the same set of audio source locations (with L indicating whether an audio source is on or off), to each produce the correct partial mix (SMM), which correctly sum to the final mixes, after the dynamic change of an audio source's location.

The techniques disclosed herein may work best where the control parameters received at each of the nodes 10, 20 are equivalent sets of control parameters. Ideally, all of these parameters would be identical or at least equivalent between the nodes 10, 20: n, $F_i$, $CP_i$, and $\text{Audio}_i$ (respectively the number of audio channels, the amplitude of each audio source, the processing functions for each channel, and the identity of the source audio channels themselves.)

Split into two identical copies this way, with the only additional information being the knowledge of the location of the audio signal (this knowledge may be automatically derived or computed, either from an address mapping, a naming convention, a database directly, or other method), means that the management of the audio mixing function and the tasks of the human operator, appear to be no different than operating a traditional self-contained mixing console in one location. Furthermore, this one mixing console may be physically present in front of the user if desired, providing a simple hands on operation, without needing to know or care which parts of the operations are in which location (local or remote).

This reduction in complexity may depend on the use of a single set of control parameters, interpreted identically (or at least equivalently so that any resulting differences are imperceptible to a human auditory system in a normal or typical range) in multiple locations. If a distributed mix was created using heterogeneous mixing units, different command parameters, different indexes, and different reference would have to be given to each of the different mixing units, which is what adds the undesired complexity.

In one embodiment (not shown), one or both of the nodes 10, 20 include one or more translators that, prior to or after the parameters are transmitted to a node (in the example of FIG. 1, from the node 10 to the node 20), translate a first version of the parameters as produced by the audio mixer 12 (or other equipment at the location providing the parameters) to a second version of the parameters usable by equipment at the remote location (node 20 in the example of FIG. 1). For example, the transmitter 14 may transmit the parameters as outputted by the mixer 12 or the transmitter 14 may transmit parameters as translated by a translator. The receiver 26 may receive the parameters as outputted by the mixer 12 to be translated by a translator at node 20 or it may receive the parameters already translated. In this embodiment, the audio mixer 12, 22 receives the translated parameters to process (or control processing) of the local audio sources S1, S2 according to the translated parameters to produce the local audio mix $Mix_{10}$, $Mix_{20}$. The translation should be such that it results in equivalent parameters so that any resulting differences are imperceptible to a human auditory system in a normal or typical range.

In a preferred embodiment, the system 1 includes mixers 12, 22 implemented as identical software mixers. Each identical copy of the software mixer communicates exact copies of the control commands and parameters to each node 10, 20, . . . , m. Furthermore, the communication of configuration information is also the same at each node including the addition of the location information of each audio source.

Figure 2:
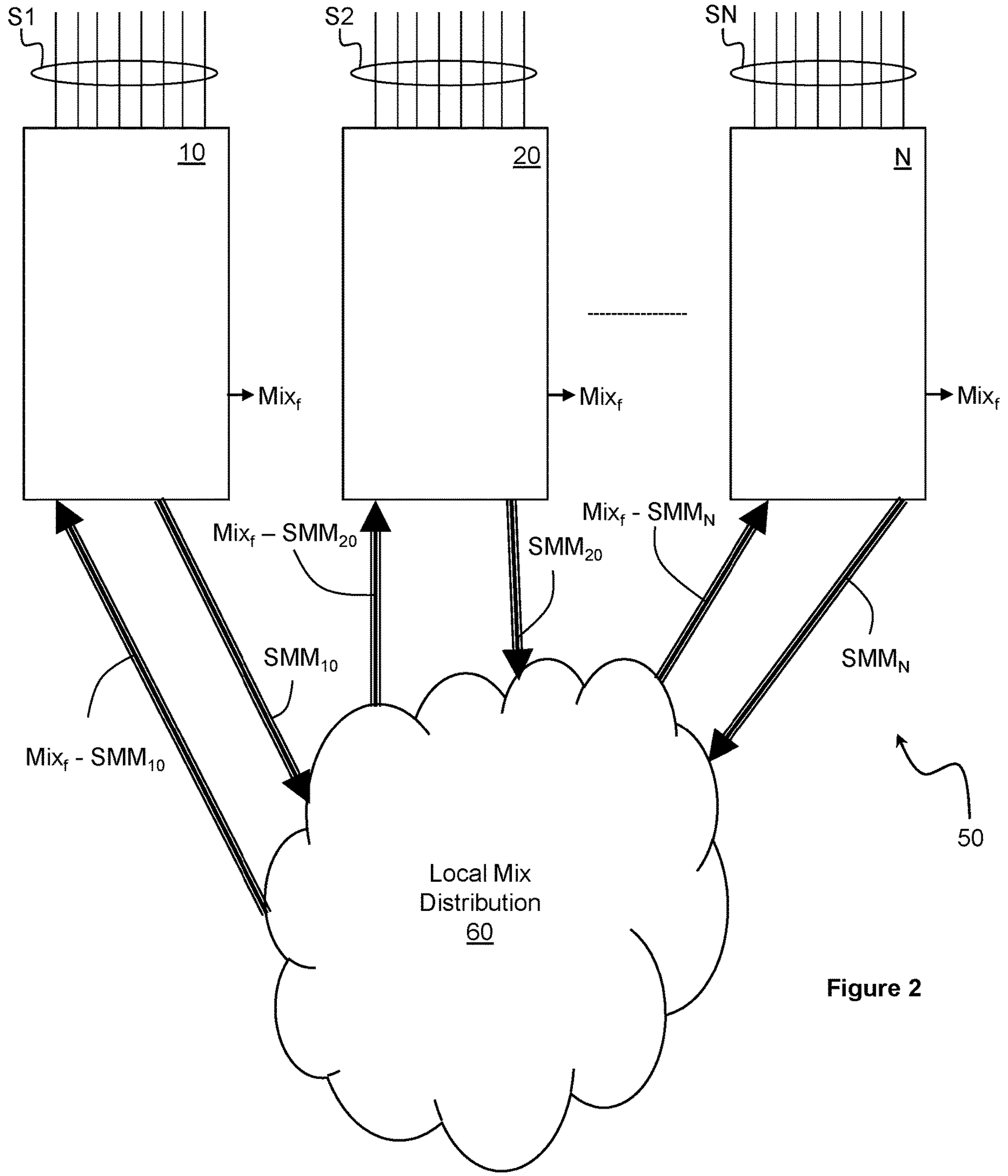
FIG. 2 illustrates a block diagram of another exemplary distributed audio mixing system.
Figure 3A:
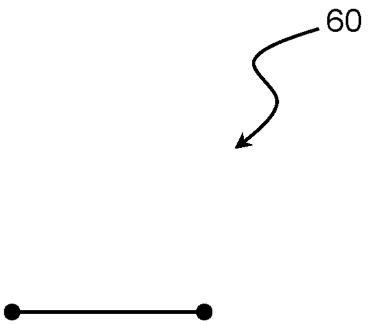
FIGS. 3A-3E illustrate schematic drawings for an exemplary local mix distributions implemented as a hypercube connection topology.
Figure 3B:
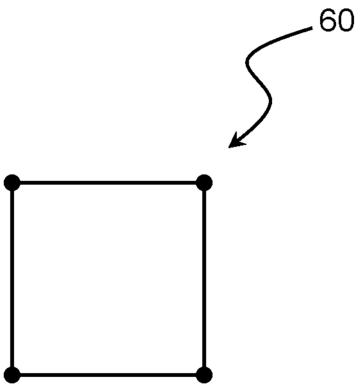
Figure 3C:
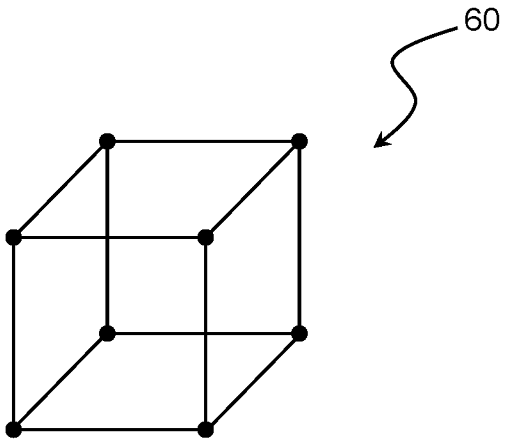
Figure 3D:
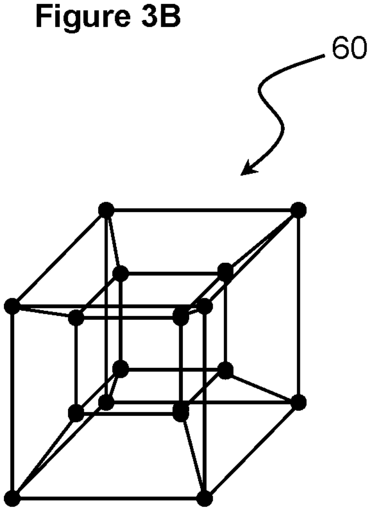
Figure 3E:
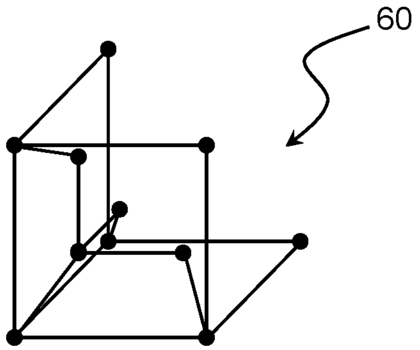

FIG. 2 illustrates a block diagram of an exemplary distributed audio mixing system 50. The system 50 is similar to the system 1. Each node 10, 20, . . . , N has direct access to its local sources S1, S2, . . . , SN, while the sources are not directly available to any other node. Each node 10, 20, . . . , N has a bidirectional connection to a local mix distribution 60. This is so named, because only local mixes (i.e., SMM) must be distributed among nodes. Local sources or mix-minuses that depend on the destination do not need to be distributed. Each node is responsible for creating and sending its own local mix $SMM_{10}$, $SMM_{20}$, $SMM_N$.

One possible implementation of the local mix distribution 60 is a hypercube connection topology (HCT). For two nodes, the HCT is just the two nodes attached by a single connection. For $N=2^i$ nodes, the HCT is formed by first forming the HCT for $2^{i-1}$ nodes (call this "copy A"), making a second copy of this topology (and assigning new node numbers to the newly created nodes) (call this "copy B"), and then attaching each node in copy A to the corresponding node in copy B by a single connection.

FIGS. 3A-3E illustrate schematic drawings for exemplary local mix distributions 60 implemented as an HCT. Specifically, FIGS. 3A, 3B, 3C, 3D, and 3E illustrate the HCT for N=2, N=4, N=8, N=16, and N=11, respectively. Lines represent connections and dots represent nodes. The schematic drawings intend to illustrate three dimensional shapes. Thus, apparent intersections between lines do not represent any type of node or connection.

For a number of nodes, N, that is not equal to a power of 2, the HCT for the first power of two larger than N is formed. Then, a single node is removed arbitrarily. Removal of nodes continues with nodes that are nearest neighbors to the arbitrarily removed node, and then with nearest neighbors to these secondarily removed nodes, and so on until the desired number of nodes remain. A nearest neighbor is defined as a node that is directly attached to another node via a single connection.

To distribute the SMM mixes through an HCT, each node sends the following to all of its nearest neighbors:

Its own local mix, SMMi

All local mixes that it has received with a time-to-live (TTL) tag greater than 0

Upon traversing a connection, the TTL tag of a mix is decremented by 1 (in actual implementation, this decrement could be done by either the sending or receiving node, but for purposes of explanation, the decrement is taken to be a property of the connection). The initial TTL assigned to a local mix is ceiling($\log_2$(N)), where the ceiling( ) function gives the next integer greater than its argument. In other words, the TTL is the "i" from N=2i for the formation of the HCT as described above. This will guarantee that all nodes receive all SMM local mixes. Note, however, that some nodes will receive some local mixes multiple times, so there may be room yet for optimization.

To physically realize the HCT, each connection may use an Ethernet physical link. Alternately, each connection could be a virtual path through a computer IP network fabric consisting of a number of links and forwarding hops. The connection may use underlying protocols, such as Internet Protocol (IP), User Datagram Protocol (UDP), or Real-time Transport Protocol (RTP) to communicate the underlying information.

Example methods may be better appreciated with reference to flow diagrams.

Figure 4:
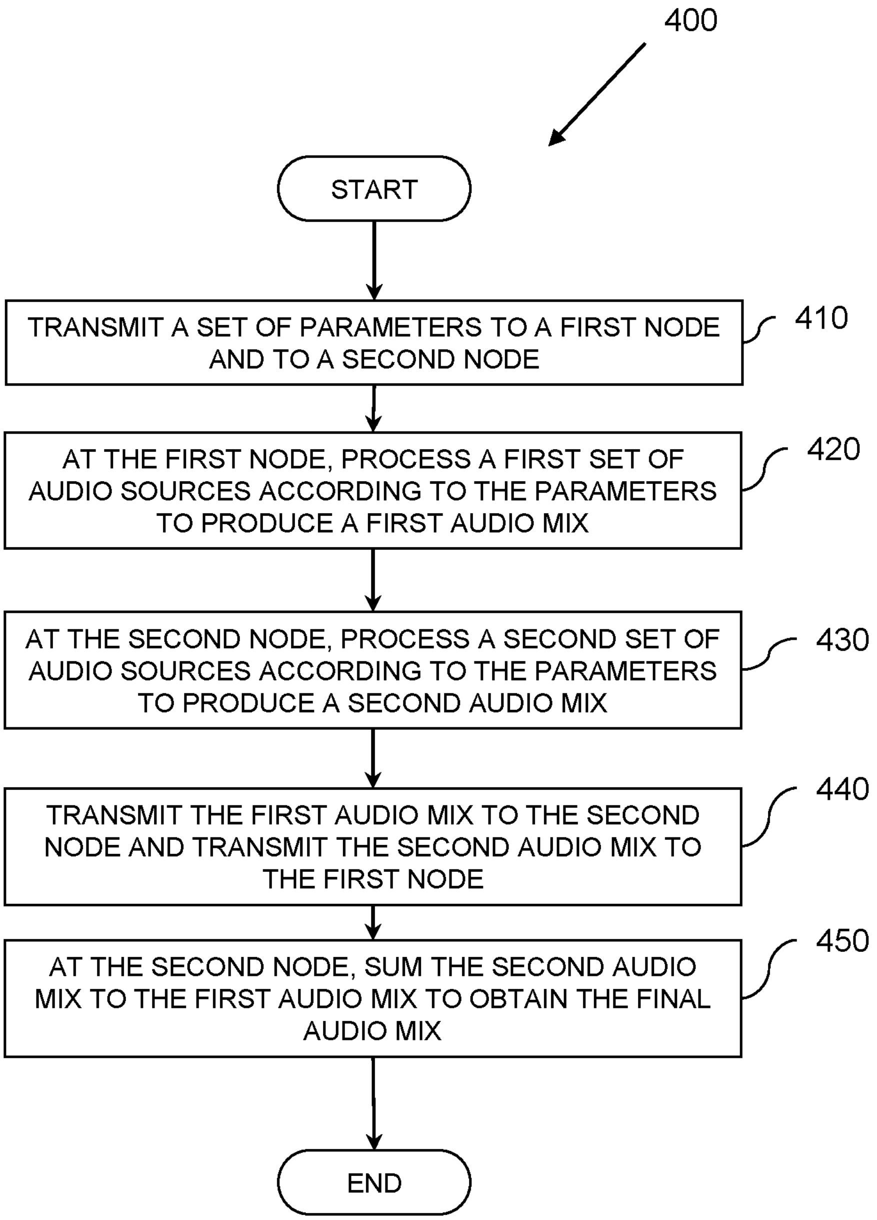
FIG. 4 illustrates a flow diagram for an exemplary method for distributed audio mixing.

FIG. 4 illustrates a flow diagram for an exemplary method 400 for distributed audio mixing. At 410, the method 400 includes transmitting a set of parameters to a first node and to a second node. At 420, the method 400 includes, at the first node, processing a first set of audio sources according to the parameters to produce a first audio mix. At 420, the method 400 includes, at the second node, processing a second set of audio sources according to the parameters to produce a second audio mix. At 430, the method 400 includes, transmitting the first audio mix to the second node and transmitting the second audio mix to the first node. At 440, the method 400 includes, at the first node, summing the first audio mix to the second audio mix to obtain a final audio mix. At 450, the method 400 includes, at the second node, summing the second audio mix to the first audio mix to obtain the final audio mix.

While FIG. 4 illustrates various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other example methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an example methodology. Furthermore, additional methodologies, alternative methodologies, or both can employ additional blocks, not illustrated.

In the flow diagram, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

Figure 5:
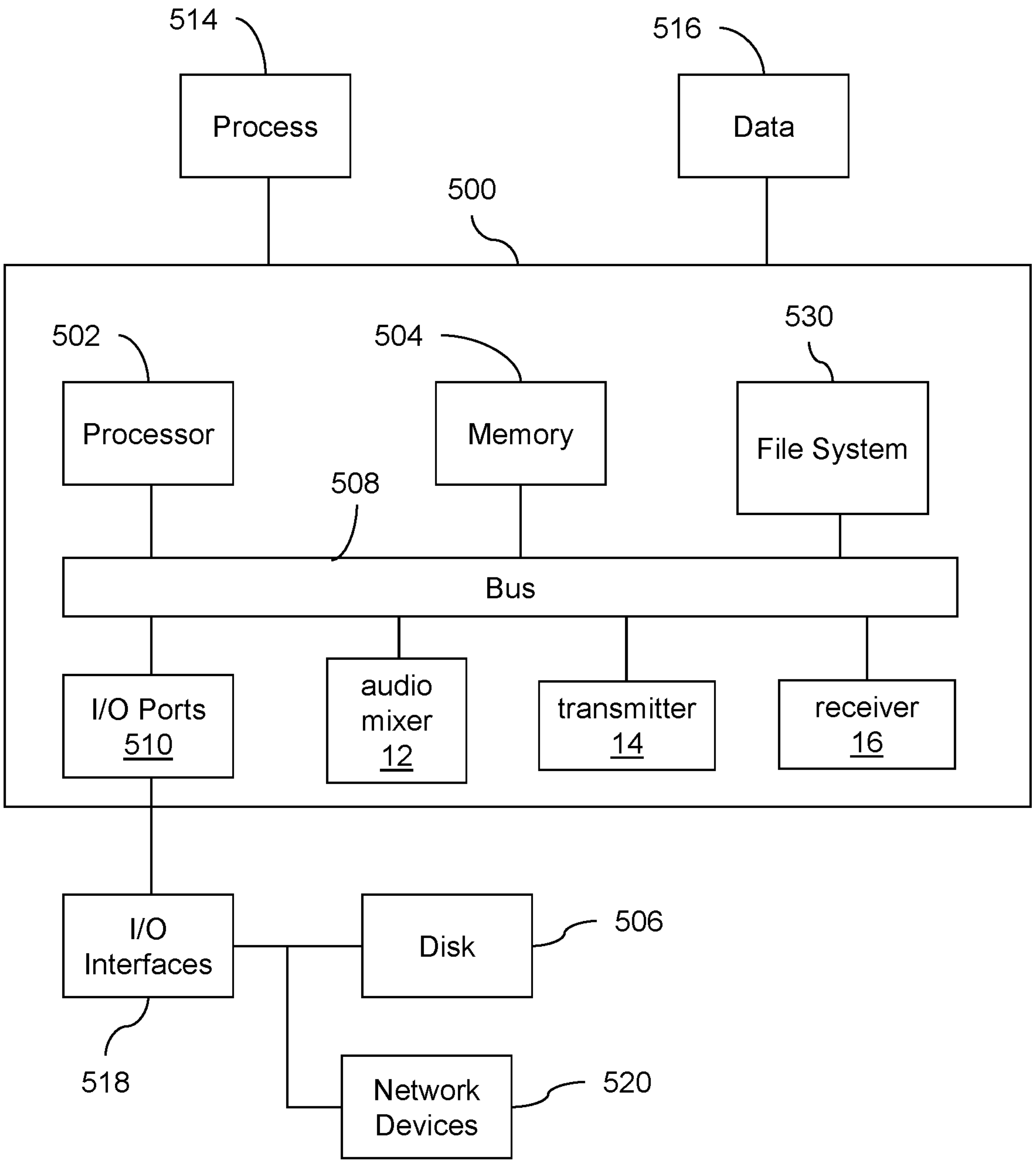
FIG. 5 illustrates a block diagram of an exemplary machine for distributed audio mixing.

FIG. 5 illustrates a block diagram of an exemplary machine 500 for distributed audio mixing. The machine 500 includes a processor 502, a memory 504, and I/O Ports 510 operably connected by a bus 508.

In one example, the machine 500 may correspond to the nodes 10, 20 and/or may include the audio mixer 12, 22, the transmitters 14, 24, the receivers 16, 26, translators, audio processors, etc. of the nodes 10, 20, etc. and all of their components. Thus, the audio mixer 12, 22, the transmitters 14, 24, the receivers 16, 26, translators, audio processors of the nodes 10, 20, etc. may be implemented in machine 500 as hardware, firmware, software, or combinations thereof and, thus, the machine 500 and its components may provide means for performing functions described herein as performed by the audio mixer 12, 22, the transmitters 14, 24, the receivers 16, 26, translators, audio processors, etc. of the nodes 10, 20, etc. and all of their components.

The processor 502 can be a variety of various processors including dual microprocessor and other multi-processor architectures. The memory 504 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to the machine 500 via, for example, an I/O Interfaces (e.g., card, device) 518 and an I/O Ports 510. The disk 506 can include, but is not limited to, devices like a magnetic disk drive, a solid-state disk drive, a floppy disk drive, a tape drive, a Zip drive, a flash memory card, or a memory stick. Furthermore, the disk 506 can include optical drives like a CD-ROM, a CD recordable drive (CD-R drive), a CD rewriteable drive (CD-RW drive), or a digital video ROM drive (DVD ROM). The memory 504 can store processes 514 or data 516, for example. The disk 506 or memory 504 can store an operating system that controls and allocates resources of the machine 500.

The bus 508 can be a single internal bus interconnect architecture or other bus or mesh architectures. While a single bus is illustrated, it is to be appreciated that machine 500 may communicate with various devices, logics, and peripherals using other busses that are not illustrated (e.g., PCIE, SATA, Infiniband, 1394, USB, Ethernet). The bus 408 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 500 may interact with input/output devices via I/O Interfaces 518 and I/O Ports 510. Input/output devices can include, but are not limited to, a keyboard, a microphone, a pointing and selection device, cameras, video cards, displays, disk 506, network devices 520, and the like. The I/O Ports 510 can include but are not limited to, serial ports, parallel ports, and USB ports.

The machine 500 can operate in a network environment and thus may be connected to network devices 520 via the I/O Interfaces 518, or the I/O Ports 510. Through the network devices 520, the machine 500 may interact with a network. Through the network, the machine 500 may be logically connected to remote devices. The networks with which the machine 500 may interact include, but are not limited to, a local area network (LAN), a wide area network (WAN), and other networks. The network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Through the network devices 520, the machine 500 may transmit in an audio over IP or audio over Ethernet environment using, for example, the AES67 standard. Similarly, the network devices 520 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

The invention claimed is:

1. A distributed audio mixing system, comprising:
a first node including:
a transmitter configured to transmit a set of parameters from the first node at a local location to one or more remote nodes at respective one or more remote locations at least multiple miles away from the local location for, at each of the one or more remote nodes, one or more remote audio sources to be processed according to the parameters to produce respective one or more remote audio mixes;
an audio mixer configured to process or control process of multiple local audio sources according to the parameters to produce a local audio mix that combines the multiple local audio sources into a single audio channel, the transmitter or a second transmitter configured to transmit the local audio mix as a remote audio mix to the one or more remote nodes;
a receiver configured to receive the one or more remote audio mixes; and
the audio mixer or a second audio mixer configured to locally sum the one or more remote audio mixes to the local audio mix to obtain a final audio mix.

2. The distributed audio mixing system of claim 1, comprising:
the transmitter or a second transmitter configured to transmit the local audio mix to the one or more remote locations for, at each of the one or more remote locations, remotely summing the one or more remote audio mixes to the local audio mix to obtain the final audio mix.

3. The distributed audio mixing system of claim 1, wherein the set of parameters includes configuration parameters and operating parameters.

4. The distributed audio mixing system of claim 1, comprising:
one or more translators configured to, prior to or after the set of parameters is transmitted from the local location to the one or more remote locations, translate a first version of the parameters as produced by the audio mixer or other equipment at the local location to a second version of the parameters usable by equipment at the one or more remote locations.

5. The distributed audio mixing system of claim 1, wherein the receiver or a second receiver is configured to continuously or periodically receive location information of the one or more remote audio sources as location of one or more of the one or more remote audio sources changes from a first remote location of the one or more remote locations to a second remote location of the one or more remote locations.

6. A distributed audio mixing system, comprising:
a first audio mixer disposed at a first node and configured to process or control processing of a first set of audio sources according to a set of parameters to produce a first audio mix that combines the audio sources in the first set into a single audio channel;
a second audio mixer disposed at a second node and configured to process or control processing of a second set of audio sources according to the set of parameters to produce a second audio mix that combines the audio sources in the second set into a single audio channel;
a first transmitter disposed at the first node and configured to transmit the first audio mix to the second node;
a second transmitter disposed at the second node and configured to transmit the second audio mix to the first node;
the first audio mixer or another audio mixer disposed at the first node configured to sum the first audio mix to the second audio mix to obtain a final audio mix; and
the second audio mixer or another audio mixer disposed at the second node configured to sum the second audio mix to the first audio mix to obtain the final audio mix.

7. The distributed audio mixing system of claim 6, wherein the second node is at least multiple miles away from the first node.

8. The distributed audio mixing system of claim 6, wherein the first transmitter and the second transmitter are configured to transmit the first audio mix to the second node and the transmitting the second audio mix to the first node, respectively, using a data reduction audio compression codec encoder/decoder.

9. The distributed audio mixing system of claim 6, wherein the final audio mix obtained at the first node is not identical to the final audio mix obtained at the second node, but any differences between the final audio mix obtained at the first node and the final audio mix obtained at the second node are imperceptible to a human auditory system in a normal or typical range.

10. The distributed audio mixing system of claim 6, wherein the first node and the second node are part of an N number of nodes, where N is larger than two, and the N number of nodes are interconnected using a hypercube topology or at least a partial hypercube topology such that a resulting number of interconnects is less than $N^2$.

11. The distributed audio mixing system of claim 6, comprising:
one or more translators configured to, prior to or after the set of parameters is transmitted from the first node to the second node, translate a first version of the set of parameters as produced by the audio mixer or other equipment at the first node to a second version of the set of parameters usable by equipment at the second node.

12. The distributed audio mixing system of claim 6, wherein the second transmitter is configured to continuously or periodically transmitting location information of the second set of audio sources as location of one or more audio sources of the second set of audio sources changes from a) the second node to the first node or b) the second node to a third node.

13. A distributed audio mixing method, the method comprising:
transmitting a set of parameters from a local location to one or more remote locations at least multiple miles away from the local location for, at each of the one or more remote locations, one or more remote audio sources to be processed according to the parameters to produce respective one or more remote audio mixes;

processing multiple local audio sources according to the parameters to produce a local audio mix that combines the multiple local audio sources into a single audio channel;

receiving the one or more remote audio mixes; and locally summing the one or more remote audio mixes to the local audio mix to obtain a final audio mix.

14. The distributed audio mixing method of claim 13, comprising:

transmitting the local audio mix to the one or more remote locations for, at each of the one or more remote locations, remotely summing the one or more remote audio mixes to the local audio mix to obtain the final audio mix.

15. The distributed audio mixing method of claim 13, wherein the set of parameters includes configuration parameters and operating parameters.

16. The distributed audio mixing method of claim 13, wherein the transmitting the set of parameters from the local location to the one or more remote locations includes translating a first version of the parameters as produced by equipment at the local location to a second version of the parameters usable by equipment at the one or more remote locations.

17. The distributed audio mixing method of claim 13, comprising:

continuously or periodically receiving location information of the one or more remote audio sources as location of one or more of the one or more remote audio sources changes from a first remote location of the one or more remote locations to a second remote location of the one or more remote locations.

18. A distributed audio mixing method, the method comprising:

transmitting a set of parameters to a first node and to a second node;

at the first node, processing a first set of audio sources according to the parameters to produce a first audio mix that combines the audio sources in the first set into a single audio channel;

at the second node, processing a second set of audio sources according to the parameters to produce a second audio mix that combines the audio sources in the second set into a single audio channel;

transmitting the first audio mix to the second node and transmitting the second audio mix to the first node;

at the first node, summing the first audio mix to the second audio mix to obtain a final audio mix; and at the second node, summing the second audio mix to the first audio mix to obtain the final audio mix.

19. The distributed audio mixing method of claim 18, wherein the second node is at least multiple miles away from the first node.

20. The distributed audio mixing method of claim 18, wherein the transmitting the first audio mix to the second node and the transmitting the second audio mix to the first node includes using a data reduction audio compression codec encoder/decoder.

21. The distributed audio mixing method of claim 18, wherein the final audio mix obtained at the first node is not identical to the final audio mix obtained at the second node, but any differences between the final audio mix obtained at the first node and the final audio mix obtained at the second node are imperceptible to a human auditory system in a normal or typical range.

22. The distributed audio mixing method of claim 18, wherein the first node and the second node are part of an N number of nodes where N is larger than two and the N number of nodes are interconnected using a hypercube topology or at least a partial hypercube topology such that a resulting number of interconnects is less than $N^2$.

23. The distributed audio mixing method of claim 18, wherein the transmitting the set of parameters to the first node and to the second node includes translating a first version of the parameters as produced by equipment at the first node to a second version of the parameters usable by equipment at the second node.

24. The distributed audio mixing method of claim 18, comprising:

continuously or periodically transmitting location information of the first set of audio sources and the second set of audio sources as location of one or more audio sources of the first set of audio sources and the second set of audio sources changes from a) the first node to the second node, b) the second node to the first node, c) the first node to a third node, or d) the second node to the third node.

* * * * *